United States Patent [19]

Wiberg

[11] 4,233,096
[45] Nov. 11, 1980

[54] CABLE SPLICING METHOD WITH REDUCED WASTE OF CROSS-LINKED POLYMER INSULATION

[75] Inventor: Karl-Gunnar Wiberg, Stockholm, Sweden

[73] Assignee: ASEA Aktiebolag, Västerås, Sweden

[21] Appl. No.: 12,242

[22] Filed: Feb. 14, 1979

[30] Foreign Application Priority Data

Feb. 17, 1978 [SE] Sweden .................................. 7081832

[51] Int. Cl.³ ....................... B21F 15/02; B65N 69/02; B29C 19/00
[52] U.S. Cl. ...................................... 156/49; 156/158; 156/304.2; 156/304.3
[58] Field of Search ........................... 156/49, 158, 304

[56] References Cited

U.S. PATENT DOCUMENTS

| | | | |
|---|---|---|---|
| 1,656,258 | 1/1928 | Yale | 156/49 |
| 2,703,300 | 3/1955 | Koon | 156/158 |
| 4,084,307 | 4/1978 | Schultz | 156/49 |

Primary Examiner—Douglas J. Drummond
Attorney, Agent, or Firm—Watson, Cole, Grindle & Watson

[57] ABSTRACT

Electrical cables having cross-linked polymer insulations are spliced by heating the insulations nearest the ends to be joined to a temperature such that the cross-linked polymers become amorphous, then expanding and axially moving the insulations away from the conductors such that they can be joined, then cooling the displaced insulations, then joining the conductors, and then reheating the insulations such that they return to generally their original shape and position around the conductors. The prior art technique of bevelling the insulators nearest the cable ends prior to conductor joining, with concurrent waste of insulating material, is made unnecessary.

9 Claims, 8 Drawing Figures

Fig. 5
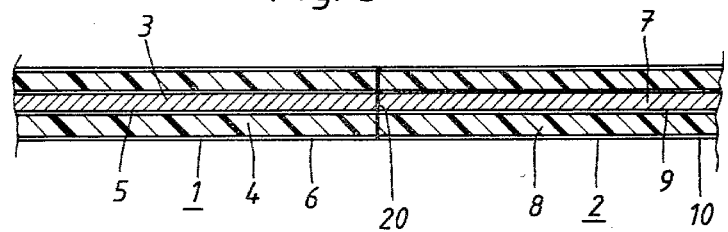
Fig. 6
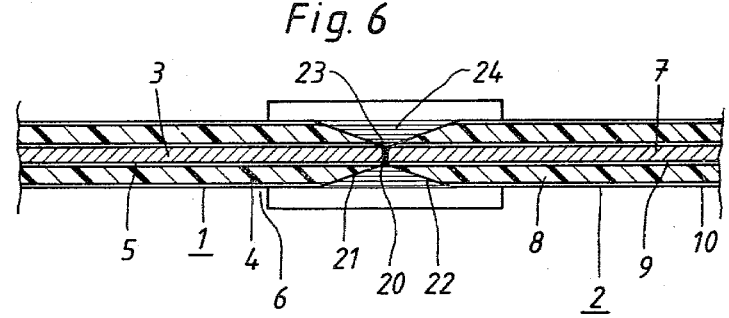
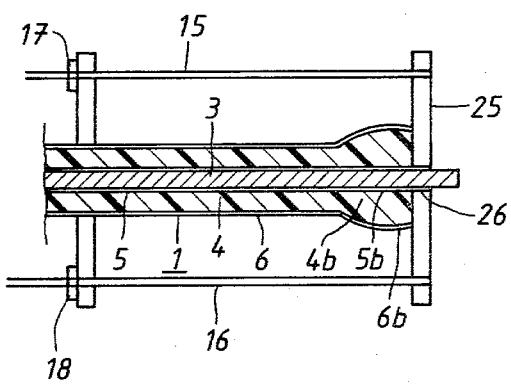
Fig. 7
Fig. 8
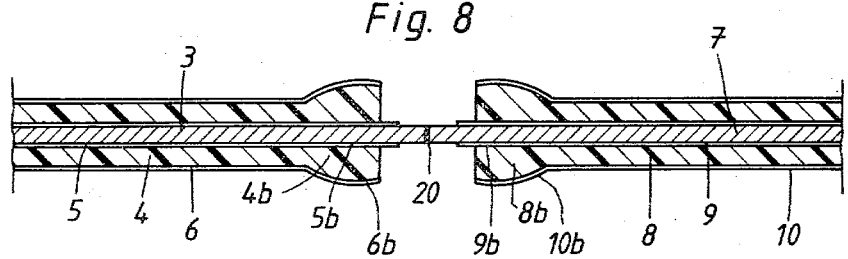

CABLE SPLICING METHOD WITH REDUCED WASTE OF CROSS-LINKED POLYMER INSULATION

BACKGROUND OF THE INVENTION

1. Field of the Invention

The present invention relates to an improved method of splicing two insulated electrical cables, and more specifically, to the splicing of electrical cables which include a conductor wrapped with an insulation composed of a cross-linked polymer.

2. Prior Techniques

Normally when two electrical cables which include a conductor wrapped with an insulation of cross-linked polyethylene are to be spliced, the insulations nearest the ends of each of the cables are first removed, usually in a bevelled fashion such that the insulation which remains near the ends will have a decreasing cross-section in a direction towards the cable ends, and the inner conductors are joined. After the conductors of the two cables are joined, for example by welding or soldering, and after a conductive layer (i.e., inner conductive layer) has been applied around the joint (at least in circumstances where the cables are high voltage types), the joint area is normally insulated by wrapping the area around the exposed conductors (and the parts of the insulation which are located near the cable ends) with several layers of an unvulcanized polyethylene-type material containing a cross-linking agent, such as di-α-cumyl peroxide or di-tert. butyl peroxide. The joint area is then subjected to a sufficiently high pressure and temperature that the layers of the tape will melt to form a homogeneous, cross-linked compound. Subsequently, and especially when the cable is a high voltage cable, a conductive layer (outer semiconductive layer) is applied over the insulation at the joint. This latter step can in fact be done either after or in connection with the formation of the homogeneous insulation covering.

The foregoing procedure has been used also when splicing cables which have cross-linked polymer insulations other than polyethylene. Normally, however, the wrapping tape which is used will be composed of the same polymer material contained in the original cable insulation.

The noted prior art procedures, however, result in waste, insofar as the insulation which was originally present at the ends of cables to be spliced is at least partially removed and discarded. This insulation must then be replaced with new insulating material once the conductors of the cables have been joined.

It is thus an object of the present invention to provide an improved splicing procedure for electrical cables which have an insulation of cross-linked polymer, and particularly an insulation of cross-linked polyethylene.

SUMMARY OF THE INVENTION

According to the present invention the conductors of the cables nearest the ends that are to be joined are first exposed, the ends of conductors are then joined, and the area around the exposed, joined conductors is provided with an insulation therearound; however, instead of having the conductors near the cable ends exposed by bevelling away the existing insulation, these ends are first heated and the insulations therearound are forced to both expand in a radial fashion away from the conductors and be displaced axially away from the cable ends. Thereafter the insulations are allowed to cool (such that they become fixed in their displaced positions), the exposed ends of the two conductors are joined, and the insulations are then heated again, such that the insulations are caused to return to generally their original shape and position around the respective conductors. Thus, the joint between the two cables is insulated with little or no need for use of any additional insulation materials.

When the insulations are heated as noted above, the cross-linked polymer material which is contained therein changes from a crystalline state to an amorphous state, thus allowing it to radially expand and/or be axially displaced. When the expanded and displaced portion of the insulation is then allowed to cool, it will retain its new configuration due to a return of the polymer material to its crystalline form. When heated again, the insulation will likewise be made amorphous, allowing it to return to its original shape. Thus, the present invention is based on the realization that the property of a cross-linked polymer which allows it to expand and thereafter return to its original shape can be utilized when joining the ends of two cables, and thereby reduce the need for use of new insulating material in the joint area.

If the cables to be spliced have an inner semiconductive layer, these layers can be displaced simultaneously with the insulation, and they will accompany the displaced insulation when it returns to its original position. Thus, no cavities will be formed between the inner semiconductive layer and the insulation at the joint.

The noted displacement of the insulations at the ends of each cable can be achieved by use of a tool which includes an axial hole of substantially the same diameter as the diameter of the conductors of the cables. The tool itself may have a conical shape, with the pointed portion able to press in between the insulation and the conductor, or else, if the cable includes an inner semiconductive layer, in between the inner semiconductive layer and the conductor. The tool may, however, be just a flat plate. Forced contact with the tool will cause the insulation (or the insulation and the inner semiconductive layer) to be displaced in both an axial and radial fashion, thereby exposing the conductor of the cable so as to allow joining with a similarly exposed conductor.

Further objects, advantages and features of the present invention will become apparent from a review of the accompanying drawings taken in conjunction with the following discussion.

DESCRIPTION OF THE DRAWINGS

In the drawings,

FIG. 5 depicts the two cables as shown in FIG. 4 in their ultimately connected condition, i.e., so as to separately appear as in their original condition, shown in section;

FIG. 6 depicts an embodiment of the invention wherein two cables which have had their conductors joined together according to the invention then have new insulation applied in the area of the joint, shown in side section;

FIG. 7 schematically shows the side view of a structure which, although different from that shown in FIG. 2, is capable of axially displacing the insulation around the conductor of a cable in an alternate manner; and FIG. 8 depicts a side view of the two cables of FIG. 7 which have had their conductors joined, each cable being shown in section.

DETAILED DESCRIPTION OF THE PREFERRED EMBODIMENTS

Figure 1:
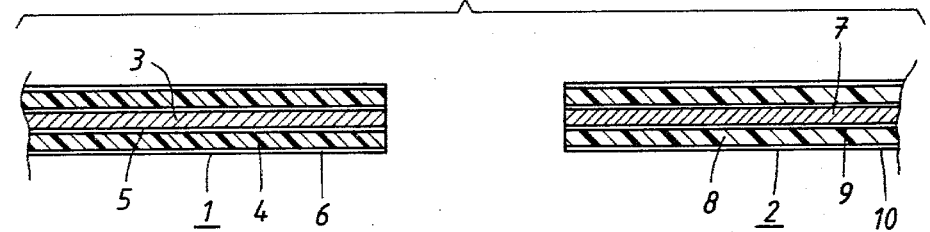
FIG. 1 depicts an exploded side view of two cables to be joined, each shown in section.

As shown in FIG. 1, two cables 1 and 2 which are to be joined together will include, respectively, main conductors 3 and 7, inner conductive layers 5 and 9, insulation layers 4 and 8, and outer conductive layers 6 and 10. Neither cable, it should be appreciated, is shown with the conventional metal screen or sheath layers. The insulation layer on each cable will normally comprise a cross-linked polyethylene, and both the inner conductive layer (inner semiconductive layer) and the outer conductive layer (outer semiconductive layer) will have been applied via extrusion of a plastic material containing conductive materials, e.g., a plastic material such as a copolymerisate of ethylene and ethyl acrylate or a copolymerisate of ethylene and vinyl acetate, together with a conductive material such as carbon black.

Figure 2:
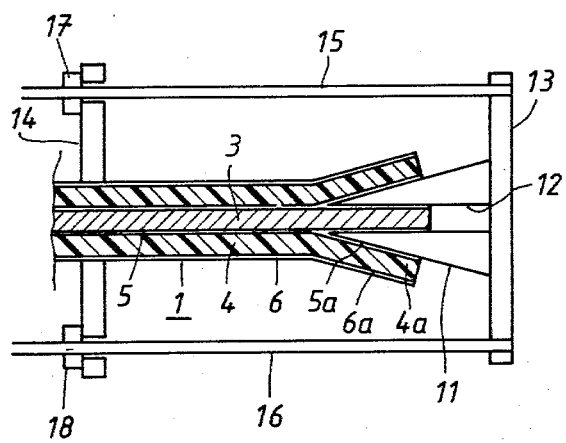
FIG. 2 schematically shows the side view of a structure capable of axially displacing the insulation on a cable, the cable being shown in section.
Figure 3:
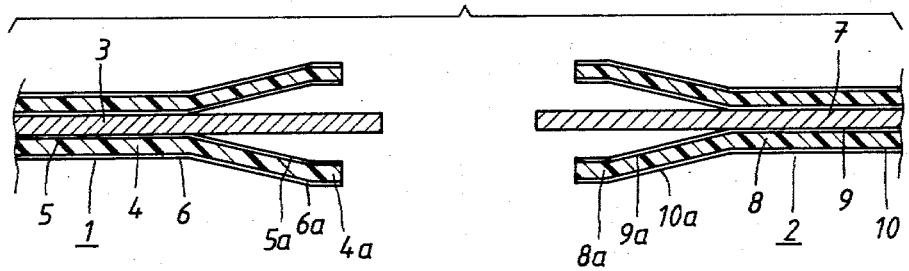
FIG. 3 depicts an exploded side view of two cables to be joined, each having had its insulation displaced in a fashion as shown in FIG. 2, and each being shown in section.

The displacement of the insulation near the ends of the respective cables, i.e., for effective joining of the inner conductors, can be achieved as depicted in FIG. 2. As shown therein, a conical tool 11 which has a hole 12 therethrough which is slightly larger in diameter than the outer diameter of the conductor 3 to be operated upon is supported by an end plate 13, which is itself connected in spaced apart fashion from another plate 14 via threaded bolts 15 and 16 which are fixed to the end plate 13. The cable 1 to be treated is passed through an opening in the plate 14 and fixedly positioned with respect thereto, and adjustment of bolts 15 and 16 and interaction with nuts 17 and 18 which contact the side of plate 14 opposite the side facing end plate 13 will result in axial movement of plate 14 with respect to end plate 13 such that the cable can be moved towards and away from conical tool 11. When the insulation 4 of the cable 1 has been heated to about 125° C., i.e., that portion of the insulation at the end of the cable which is to be contacted by the conical tool 11, such that the polymer material changes from a crystalline to a substantially amorphous state, the cable is moved towards conical tool 11 such that the forward edge thereof will be pressed in between the inner conductive layer 5 and the conductor 3 such that a heated, expanded portion of the layers around the conductor 3 will be formed, this expanded portion including inner conductive layer portion 5a, insulation layer portion 4a and the outer conductive layer portion 6a. The expanded portion of the layers around the conductor 3 will necessarily be also displaced in an axial direction with respect to the end of the stripped conductor of the cable. After the expanded and displaced insulation has cooled, it is removed from contact with the tool 11. Using this same technique, the layers around an opposing cable (such as cable 2 of FIG. 1) are expanded and displaced, such that the conditions as shown in FIG. 3 are achieved (the displaced layers in such a cable 2 being shown in FIG. 3 as portions 9a, 8a and 10a).

Figure 4:
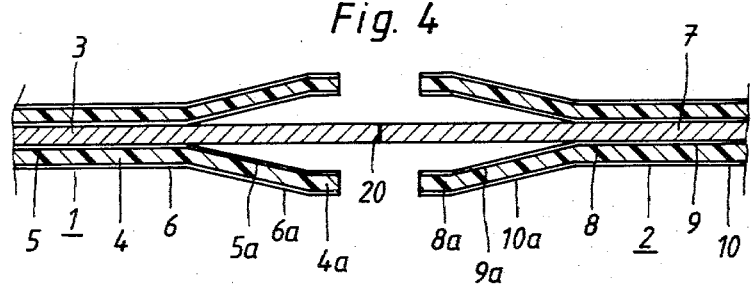
FIG. 4 depicts a side view of the two cables of FIG. 3 which have had their conductors joined, each cable being shown in section.

Subsequent to the foregoing, the conductors of the cables are joined to each other (see FIG. 4) by welding or by a jointing sleeve, thus obtaining a joint 20. The expanded and displaced portions of the cables are then again heated to about 125° C. such that the polymer material of the insulating layers 4a, 8a will resume their amorphous states, and then the portions are caused to relocate against the respective conductors such that the original conditions of the cable conductors are approximately duplicated (FIG. 5).

Sometimes it is desirable or required that a tighter connection between the insulations be obtained between the joined cables than is achievable by the foregoing procedure. One way of achieving this result is to apply an unvulcanized polymer containing a cross-linking agent between the insulations and then cross-linking the polymer. Such a procedure can be accomplished as shown in FIG. 6, which procedure can also enable an efficient connection of the inner conductive layers 5 and 9 of the cables. In accordance with the procedure, after the cables have been joined as in FIG. 5, the insulations 4 and 8, respectively, are bevelled into a conical shape at the ends 21 and 22 (see FIG. 6). A conductive layer 23 (inner semiconductive layer) is then applied over the exposed conductors of the two cables at joint 20, this layer 23 making contact with respective conductive layers 5 and 9. The layer 23 can be in the form of a wrapped tape of unvulcanized polyethylene material containing a cross-linking agent, e.g., an α-cumyl peroxide or di-tert. butyl peroxide material containing carbon black. The area outside of the layer 23 and between the bevelled insulations is then wrapped with a tape of unvulcanized polyethylene material containing a cross-linking agent, e.g., α-cumyl peroxide or di-tert. butyl peroxide, such that a tight wrapping 24 is obtained. The wrapping is then subjected to a pressure of about 5 atmospheres and a temperature of about 150° C. for several hours such that the layers of tape will melt together to form a homogeneous, cross-linked compound which provides a continuous transition between the insulations 4 and 8 and has the same appearance the properties as the materials therein. The polyethylene in the conductive layer 23 is simultaneously cross-linked.

It should be noted that instead of a tape, it is also possible to use, among other things, granules to produce the insulation 24.

In order to apply the pressure and supply the heat on the noted wrappings, it is possible to use, among other things, a heatable pressure device in the form of a two-part tool (not shown) having a cylindrical forming cavity, a pressure vessel or a pressure wrapping of, for example, silicon rubber. In this regard, such heatable pressure devices for applying insulations when joining cables are well known.

Upon the conclusion of the foregoing, an outer conductive layer is applied (not shown in FIG. 6) in order to connect conductive layers 6 and 10, as by painting the insulated joint with a colloidal aqueous solution of graphite. Alternatively, the layer can be formed in a manner analogous to the way the inner conductive layer 23 is formed, i.e., by wrapping a tape containing polyethylene and a conductive material (carbon black) around the wrapping 24 and cross-linking it with the rest of the wrappings.

Turning now to the embodiment of the invention depicted in FIG. 7, a device is depicted which is capable of displacing the layers surrounding the main conductor 3 of a cable 1 in a fashion distinct from that depicted in FIG. 2. In this device, the conical tool 11 of the FIG. 2 apparatus is eliminated, and the end plate 25 is instead provided with a hole 26 which is slightly larger than the diameter of either the main conductors 3 or 7 of the cables to be joined. By pressing against the end plate 25, expanded and displaced (squashed) insulation portions are produced, together with the adjacent inner and outer conductive layers, 4b, 5b, 6b and 8b, 9b, 10b (FIG. 8). Once the main conductors are joined at 20, the expanded and displaced insulation portions are again heated, and these layers will return to generally their original shape such that the joined cables of FIG. 5 will be obtained. The connection between the layers may, if desired or required, be improved in the manner as described in conjunction with FIG. 6.

In certain situations it may be suitable to cut off a piece of the exposed main conductors 3 and 7 before they are joined together to form a joint 20. In such cases, the layers spanning the joint may be formed so as to be thicker than the initial layers which, in certain cases, will facilitate the formation of a joint of good quality between the layers.

Once the joining of the layers is achieved as described above, the cable conductor may be provided with a metallic screen covering and a sheath at the joint, as is conventional.

Although the invention has been discussed with respect to the use of cross-linked polyethylene as the insulation material at the joint, the invention is applicable to cables having insulations of cross-linked polymers other than polyethylene, e.g., copolymer of ethylene and propylene, copolymers of ethylene and propylene with diolefines such as dicyclo-pentadiene or 1.4-hexadiene, or mixtures of polyethylene with any of the mentioned copolymers. These materials can also be used as the material for wrapping around the joint. Indeed, if the insulation around the joint is to be the same type as the original insulation of the cables, which is normally desirable, the same polymer is used in the insulation wrappings around the joint as forms the insulation of the cable. It should be noted, however, that it is possible to use other polymer materials in the insulation wrappings around the joint than is used to form the original insulation of the cables.

While there have been shown and described some preferred embodiments of the present invention, it should be recognized that various changes and modifications can be made therein and still fall within the scope of the appended claims.

I claim:

1. A method for splicing two electrical cables which have conductors insulated with a cross-linked polymers, the steps comprising
    (a) heating the insulation nearest the ends of the cables to be spliced to an elevated temperature,
    (b) displacing the heated insulations in both a radial and axial direction with respect to the ends of the cables to be spliced so as to expose the conductors to be joined,
    (c) allowing the displaced insulations to cool so they will retain their displaced forms,
    (d) joining the ends of the conductors of the cables to be spliced, and
    (e) reheating the displaced insulations such that they will return to substantially their original shape and position around the respective conductors.
2. The method as defined in claim 1 wherein the heating in step (a) is done until a temperature of 125° C. in the insulation is achieved.
3. The method as defined in claim 1 wherein said cross-linked polymers are cross-linked polyethylene.
4. The method as defined in claim 1 wherein the displacing of the heated insulations in step (b) is accomplished by pressing the ends of the cables against a tool which has a hole therethrough of essentially the same diameter as the conductors.
5. The method as defined in claim 4 wherein the tool is conical shaped and operates on the insulations such that they are radially displaced relative to the conductors.
6. The method as defined in claim 4 wherein the tool is in the form of a flat plate and operates on the insulations such that they are axially squashed.
7. The method as defined in claim 1 wherein the cables include inner conductive layers between the conductors and the insulations, and wherein the inner conductive layers are operated upon together within the insulations in steps (a) through (e).
8. The method as defined in claim 1 including the steps of
    (f) bevelling the insulations of the cables adjacent the joint therebetween into a conical shape, such that the insulations have decreasing cross sections in the directions towards said joint,
    (g) filling in the area between the bevelled portions of said insulations with an unvulcanized polymer material containing a cross-linking agent, and
    (h) applying inwardly directed radial pressure and an elevated temperature to said filler material until a homogeneous, cross-linked insulation is formed which provides for a continuous insulation between the joined cables.
9. The method as defined in claim 1 wherein between steps (c) and (d) a portion of at least one of the exposed conductors is cut off.

* * * * *